Sept. 27, 1960 J. G. CADILLAC ET AL 2,953,848
VEHICLE BOXING
Filed July 1, 1958
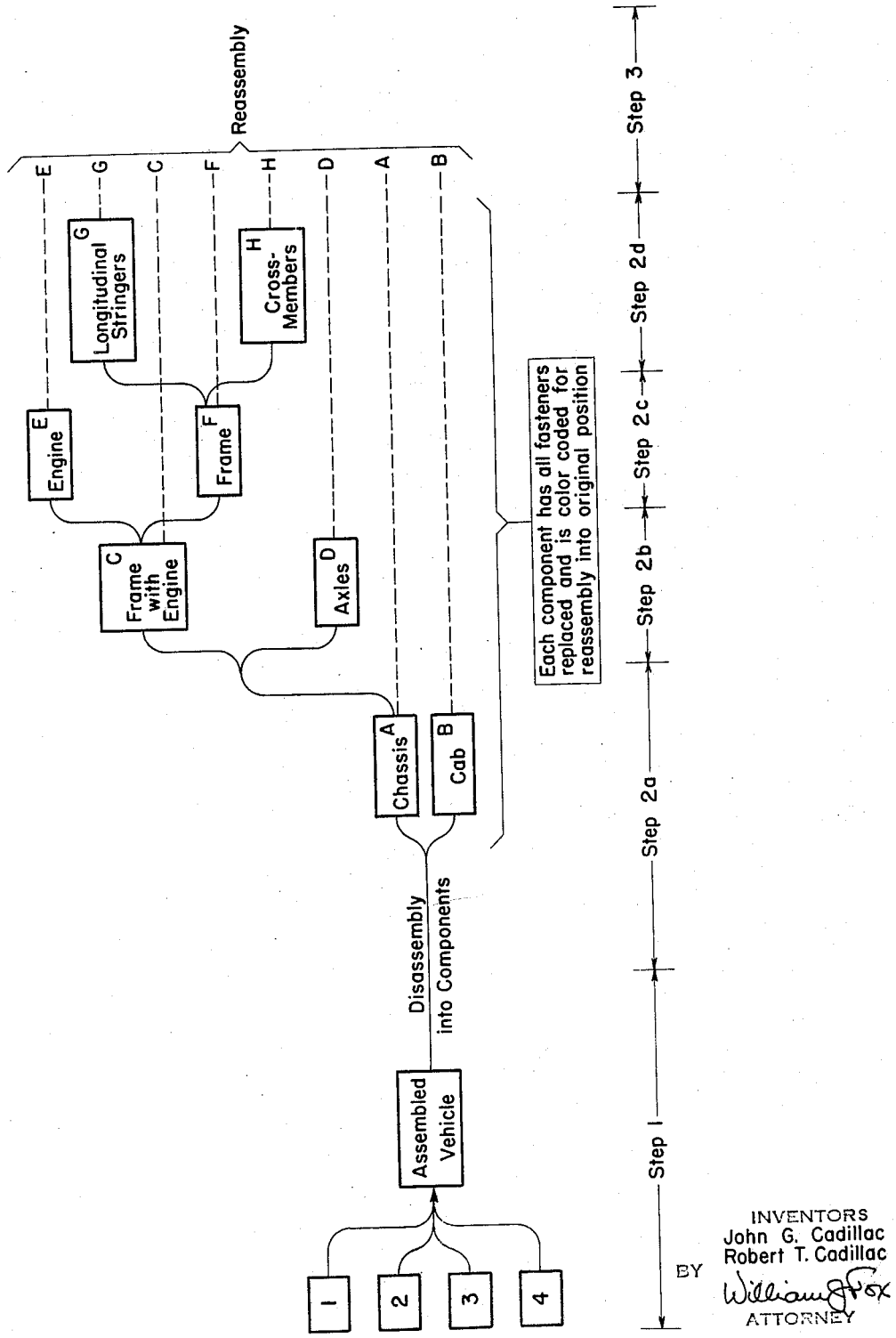
INVENTORS
John G. Cadillac
Robert T. Cadillac
BY William Fox
ATTORNEY

United States Patent Office 2,953,848
Patented Sept. 27, 1960

2,953,848

VEHICLE BOXING

John G. Cadillac, Jersey City, N.J., and Robert T. Cadillac, Brooklyn, N.Y., assignors to Aacon Contracting Company, Inc., New York, N.Y., a corporation of Delaware Filed July 1, 1958, Ser. No. 745,899

2 Claims. (Cl. 29—407)

This invention relates to the method of boxing trucks and like vehicles for overseas shipment and is specifically directed to improvements leading to a reduction in shipping cost and reassembly problems.

With rising shipping costs, it becomes imperative to find new and cheaper ways of exporting vehicles and the shipping rates are arranged on such a basis that both the weight and the cubage of the boxed items become important.

It has been the practice heretofore to export vehicles in several different ways including by shipping the completed vehicle in an unboxed condition; by shipping the completed vehicle in an assembled condition protected by a box; by shipping the unassembled parts in a box for assembly at the destination and by disassembling an assembled vehicle to reduce its size and then by shipping these parts in a box. The foregoing have been practiced for many years and have been tolerated as a means of accomplishing the objective, but there have been glaring shortcomings which up to now have not been solved despite the worldwide application of thought to the problem. The shipment of completely assembled vehicles—preferably factory assembled—is the most satisfactory from the point of view of useability of the vehicle at the destination, as its operability and completeness have been established. The shipment of unassembled parts is less expensive in terms of shipping cost, but the most expensive in terms of assembly labor and missing parts—any one item of which becomes critical if it is missing or lost upon arrival at a remote overseas destination.

This invention then proposes to overcome these objections, while taking advantage of the low shipping cost, by assembling the vehicle completely on a standard factory assembly line and then testing the vehicle by road testing, inspection, or otherwise to ascertain its completeness and operability. Then the invention proposes to disassemble a tested or assembled vehicle into major and/or minor components, as will be described later. An important and critical variation from the prior art here, however, is that in the disassembling procedure, all fastening devices are then reassembled onto their respective positions and in their proper order. This serves several important functions. Firstly, it insures that the fasteners are present in the shipment and are not missing or lost. Secondly, the assembler overseas does not need an instruction booklet (with language and literacy problems) to know which fasteners go in each position. Lastly, the complicated fasteners which include rubber biscuits or cushions, and other parts, washers, etc., are reassembled in their finished order, so that the reassembly or refastening of parts becomes evident by simple observation.

To further assist in the problem of reassembly, all parts which go together are marked with the same color so that subassemblies may be quickly brought together out of the box for reassembly. Furthemore, parts are match-marked so that they are assembled in the same positions that they occupied when factory assembled.

In the course of disassembling and then reassembling the fasteners, there are several stages to which the disassembly may be carried. This is determined principally by the freight rates which in turn take into consideration both the weight and size of the box. The freight rates are such that when the weight per unit volume exceeds certain minimums, which minimums vary with different trade routes, then a premium overcharge based on the weight is made. It therefore becomes important to have complete flexibility with respect to disassembly so to find the proper balance between weight and cubage.

The first state of disassembly of a vehicle such as a truck entails the separation of the cab from the chassis of the vehicle. With the cab go such items as front fenders, grill, hood, radiator, running boards, wheels and tires and other associated items. With the chassis go front and rear axles, engine, springs, etc.

As each of the foregoing items is removed from the once completed vehicle the fasteners are replaced. For instance, if the weight-size ratio is such that a premium payment is called for from the chassis case, then the engine may be removed and packed in its own box. The two resultant boxes will now normally be below this premium rate range and hence be cheaper to ship. To facilitate reassembly, and to insure that all parts are present, the engine mountings are replaced. The engine normally is mounted to the chassis frame by bolts which have rubber pads between the engine block and the chassis. There are also other fasteners to be replaced on the block, such as: generator, starter, carburetor, water pump, high voltage coil, distributor, oil pressure sensing unit, water temperature sensing unit and other fastening devices.

This same procedure is used for all other fasteners which are removed such as fenders, grill, running boards, step hanger, brackets, radiator, radiator mounts, hose, hose clamps and the numerous others which might be between 100 and 150 separate items, all well-known in the usual vehicle construction.

One important subassembly and method of packing it is the rear axle. The rear axle is a long and heavy item which if it is not removed increases the width of the box. It has been discovered that the axle may be removed and will fit within the chassis frame itself. In the usual chassis there are two longitudinal stringers or main framing members which run the length of the vehicle. These two members are connected to each other through cross members which span between them at fixed intervals, usually about two feet apart. The usual cross-members have the same section as do the two longitudinal members and hence are the same depth. In the center section of this frame, however, and rearward of the engine for a distance spanning about the central third of the frame, the cross-members have a shallow section because the drive-shaft must pass through this area from the engine and transmission to the rear axle. Into this space formed by the shallow sections, the axle will nest, placed longitudinally. If two chassis are placed in the same box, with one inverted so that its engine is surrounded by the lower chassis, as described in our Patent No. 2,841,278, its rear axle may be placed over the chassis, in the same position as described for the lower chassis.

A further amplification of this novel way of shipping boxed vehicles overseas is the complete breakdown of the chassis frame into its components. In this procedure, the frame would be separated into two separate longitudinal stringers and separate cross-members. The factory rivets may be quickly sheared off and bolts are placed in each hole of the cross-members for reassembly. Each piece is color-coded or match-marked so that its original position may be ascertained, and it, of course, now has the fasteners ready for reassembly. The engine and the cross-members may be boxed separately, and the longitudinal members either boxed or merely strapped together, to travel unboxed.

The single figure shows an idealized flow sheet of the assembly and disassembly steps involved. In step 1 the various components are assembled into a completed vehicle, as is now done in the factories or assembly shops. After testing, the assembled vehicle is then disassembled for shipment into any combination of a series of components from A to H depending on the weight-size ratio required for the most economical shipment of each box. This disassembly, however, has the novel step of reassembling the fasteners as was described earlier.

The disassembly into components may have several combinations such as (1) Chassis A
Cab B.
(2) Frame with engine C
Axles D
Cab B
(3) Engine E
Frame F
Axles D
Cab B
(4) Engine E
Longitudinal stringers G
Cross-members H
Cab B These could each be boxed separately or in combinations to meet the weight-cube rate most economically.

We claim:

1. The method of disassembling a vehicle for reassembly which comprises assembling the vehicle from its components, testing the vehicle for operability, disassembling the vehicle into subassemblies selected to provide the most economically sized and weighed boxes when shipped, color coding each of said subassemblies with an identical color on each component of each subassembly, match-marking each of the components so that they may be assembled in the same positions that they occupied when first assembled, and boxing the subassemblies for shipment and subsequent reassembly.

2. The method of disassembling and reassembling a vehicle which comprises assembling the vehicle from its components, testing the vehicle for operability, disassembling the vehicle into subassemblies selected to provide the most economically sized and weighed boxes when shipped, reassembling onto each subassembly substantially all fastening devices in proper sequence as in assembled condition, color marking the subassemblies with an identical color on each component of each subassembly, match-marking each of the components so that they may be assembled in the same positions that they occupied when first assembled, boxing the subassemblies, shipping the same, and reassembling the subassemblies into a completely assembled vehicle.

References Cited in the file of this patent

UNITED STATES PATENTS

| | | |
|---|---|---|
| 1,738,710 | Jones | Dec. 10, 1929 |
| 1,750,130 | Romine | Mar. 11, 1930 |
| 1,803,761 | Ludwig | May 5, 1931 |
| 1,876,759 | Romine | Sept. 13, 1932 |
| 1,900,820 | Kenyon | Mar. 7, 1933 |
| 2,333,441 | Rearwin | Nov. 2, 1943 |
| 2,428,893 | Procissi | Oct. 14, 1947 |
| 2,648,454 | Dean | Aug. 11, 1953 |
| 2,735,165 | Soref | Feb. 21, 1956 |